B. I. MAULDIN.
TROUGH VALVE.
APPLICATION FILED FEB. 16, 1909.
927,368.
Patented July 6, 1909.
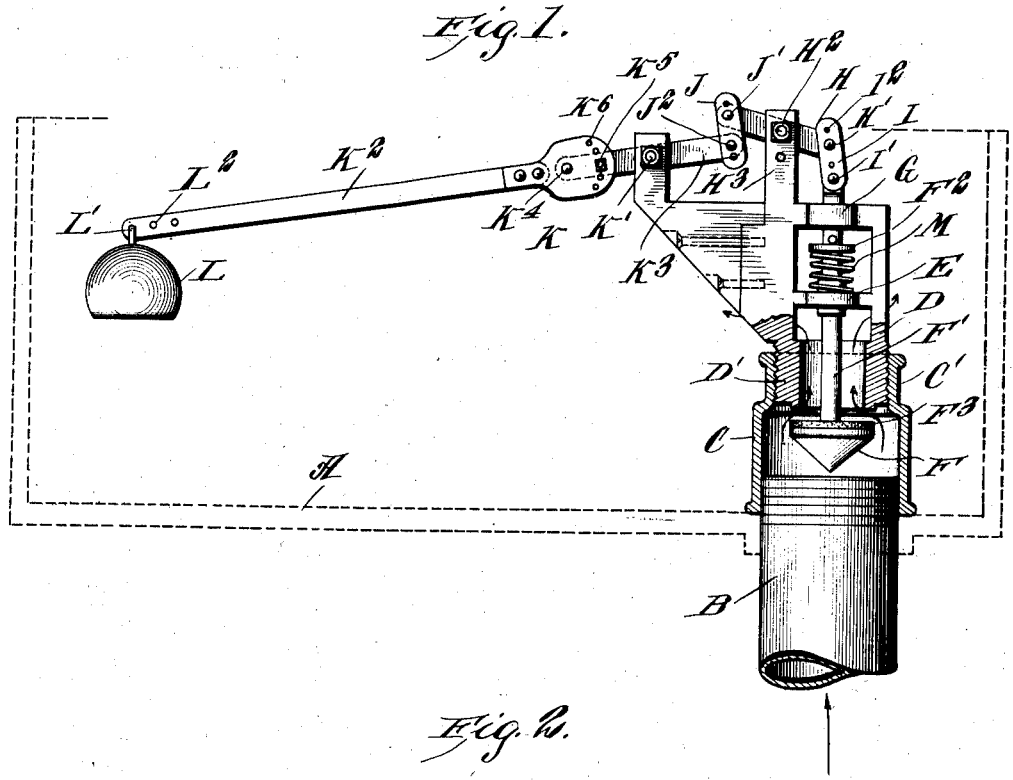
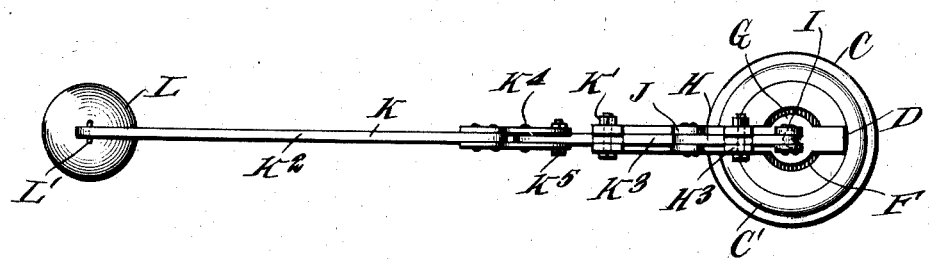
WITNESSES
INVENTOR
BLAKE I. MAULDIN
BY
ATTORNEYS

UNITED STATES PATENT OFFICE.

BLAKE I. MAULDIN, OF OZONA, TEXAS.

TROUGH-VALVE.

No. 927,368.   Specification of Letters Patent.   Patented July 6, 1909.

Application filed February 16, 1909. Serial No. 478,278.

*To all whom it may concern:*

Be it known that I, BLAKE I. MAULDIN, a citizen of the United States, and a resident of Ozona, in the county of Crockett and State of Texas, have invented certain new and useful Improvements in Trough-Valves, of which the following is a specification.

This invention is an improvement in automatic float valves designed especially for use in water troughs wherein the supply of water is conducted from a reservoir into a trough and consumed in the latter, so that the water will be automatically supplied as the water level lowers in the trough; and the present invention consists in certain novel constructions and combinations of parts as will be hereinafter described and claimed.

In the drawing Figure 1 is a vertical longitudinal section of a valve embodying my invention, the trough being shown in dotted lines. Fig. 2 is a top plan view.

The trough A is supplied from a suitable reservoir through the pipe B opening into a pipe C in the trough and threaded at C' to receive the lower end of the valve tube D which valve tube has at its lower end a projecting seat D' against which the valve proper seats and in this tube I provide at E a guide for the valve stem F' of the valve F and the stem extends above the said guide through an upper guide G and has at its upper end a loose hinge connection with one arm of a lever H, the connection being effected by means of the link I pivoted at I' at the upper end of the valve stem and having a series of openings $I^2$ through which the bolt H' for connecting the link with the lever H may be passed in securing any desired adjustment of the parts.

The lever H is fulcrumed at $H^2$ in connection with any suitable support $H^3$ and the said support has a series of openings for the passage of the pivot bolt $H^2$ so that such connection may be adjusted as desired.

The link I connects with what may be termed for convenience of reference the inner end of the lever H and the opposite or outer end of such lever is connected at J' with a link J which link is also connected at $J^2$ pivotally with the inner end of a float lever K, the link J being provided with a series of perforations for the bolts J' and $J^2$ to permit the adjustment of said connections.

The lever K fulcrums at K' and is preferably made in two sections $K^2$ and $K^3$ pivotally connected at $K^4$ with the section $K^2$ adjustable on said pivot and secured in any desirable adjustment by means of a pin $K^5$ passed through any one of a series of holes $K^6$. By this construction the device may be regulated according to the depth of water desired in the trough and can be set for either shallow or deep water as may be desired.

A float L which may have sufficient buoyancy to operate as a float within the water and sufficient gravity to act as a weight as the water level lowers is suspended by a hanger L' from the section $K^2$ of the lever and may be connected into any desired one of a number of holes $L^2$ to regulate it according to the pressure of water in the tank or reservoir. A spring M operates to lift the valve F and the levers in case the weight or float L is removed and operates as a safety device to prevent the reservoir or tank from emptying through the valve in case the said float L or the lever should become deranged or thrown out of operation. The spring as shown is a coil spring on the stem F' and operating between the guide E and a stop $F^2$ on the valve stem and operates as a valve closing spring as well as a means for counterbalancing in a way the weight of the levers, etc. The float has a leather or other suitable packing $F^3$ to abut the seat D' and is preferably conical on its under side as shown so that grass and the like will not hang on the valve.

In operation when the water level in the trough has lowered to the position shown, the float L will operate as a weight to adjust the levers to the position shown to open the valve F and the water will pass from the tank or reservoir into the trough until its level has risen to such a point as to operate upon the levers through the float L to close the valve F. In this operation it will be noticed that the valve closes in the direction of and with the pressure from the reservoir so that water will not escape even if the float and the lever mechanism should be broken off, the valve operating at such time as a check valve and such operation of the valve being aided by the action of the spring M. The pivotal support for the levers H and K is in sections held together by bolts or screws, see Fig. 1.

I claim:

1. In an apparatus substantially as described, the combination with a valve arranged to close in the direction of the pressure from the supply and having a valve stem, a spring operating upon said valve stem for closing the valve, a lever pivoted between its ends, a link pivoted to the valve stem and connected with one arm of said lever, a link connected with the other arm of said lever, a sectional lever having one section connected with the last named link and a second section pivoted to the first section and adjustable on said pivot relatively to the first section whereby to regulate the lever according to the desired height of water and a float carried by said second section of the lever, substantially as set forth.

2. The combination in an apparatus substantially as described, of a valve, an intermediate lever pivoted between its ends and arranged at one end to operate the valve, a float lever made in sections and having one section pivoted between its ends and a second section pivoted to said first section and adjustable relatively thereto on said pivot, connections between said first section and the intermediate lever and a float carried by said second section substantially as set forth.

3. The combination in an apparatus substantially as described of a controlling valve, an intermediate lever pivoted between its ends, connections between one end of said lever and the controlling valve, a float carrying lever pivoted between its ends, and connections between said float carrying lever and the other end of the intermediate lever, substantially as set forth.

BLAKE I. MAULDIN.

Witnesses:
CHAS. E. DAVIDSON,
TOM NOLEN.